United States Patent [19]

Rubin

[11] Patent Number: 4,940,498

[45] Date of Patent: Jul. 10, 1990

[54] FLUX COMPOSITION

[75] Inventor: Wallace Rubin, Northwood, Great Britain

[73] Assignee: Multicore Solders Limited, Hertfordshire, United Kingdom

[21] Appl. No.: 393,647

[22] Filed: Aug. 14, 1989

[51] Int. Cl.$^5$ .............................. B23K 35/34
[52] U.S. Cl. ..................... 148/23; 148/24; 148/25
[58] Field of Search .................... 148/23–25

[56] References Cited

U.S. PATENT DOCUMENTS

| | | | |
|---|---|---|---|
| 2,801,196 | 7/1957 | Doerr | 148/23 |
| 2,829,998 | 4/1958 | Glynn | 148/23 |
| 3,199,190 | 8/1965 | Landenslager | 148/23 |
| 3,301,688 | 1/1967 | Simpelaar | 148/23 |
| 3,330,028 | 7/1967 | Elbreder | 148/23 |
| 3,734,791 | 5/1973 | Poliak | 148/23 |

*Primary Examiner*—Peter D. Rosenberg
*Attorney, Agent, or Firm*—Harness, Dickey & Pierce

[57] ABSTRACT

In order to avoid the undesirable formation of flux residues when soldering electronic components, as in the production of printed circuit assemblies, there is used, as the solvent for a non-corrosive flux material, a mixture composed of a major proportion by weight of a monohydric alcohol and a minor proportion by weight of a water-immiscible polyalkylene glycol dialkyl or diaryl ether.

10 Claims, No Drawings

FLUX COMPOSITION

This invention relates to flux compositions and is concerned with liquid fluxes for use in the soft soldering of electronic components and circuitry by automatic or mass soldering techniques.

In the automated manufacture of printed circuit assemblies, it is common to apply to the printed circuit board (PCB) a liquid flux prior to the application of a solder to the PCB. The liquid flux may be applied by immersion or brushing, or more conveniently in the form of a spray, wave or foam, foam fluxing generally being the most common technique for mass soldering with liquid fluxes.

Liquid fluxes for use in the electronics industry are generally composed of a non-corrosive organic flux material, such as a rosin or rosin derivative or a non-rosin based organo-flux, together with one or more organic solvents, a surfactant or wetting agent to promote the wetting ability of the flux, and optionally one or more other desirable ingredients, for example a foaming agent.

Such liquid fluxes normally yield flux residues which, even if they are non-corrosive and non-conducting, give rise to a number of disadvantages which make their removal desirable and in some cases essential in order, for instance, to meet particular standards required in the manufacture of computer and telecommunications equipment, for example the Military Standard MIL-P-28809 cleanliness test (issued by the U.S. Department of Defense) which is recognised worldwide. However the removal of the flux residues by a cleaning step can be difficult if not impossible and increases the cost of the soldering operation. In addition, the cleaning step normally involves the use of one or more organic solvents such as chlorofluorohydrocarbons (CFCs), the use of which is now to be eliminated for ecological reasons.

It is accordingly an object of the present invention to provide a liquid flux composition which in use will form substantially no or minimal residues and which will therefore require no cleaning step when used in the manufacture of PCBs and the like, whilst still enabling the soldered PCB to meet any required standards.

We have found that the foregoing object can be achieved by using as the organic solvent for the flux material a novel mixture of organic solvents, at least one being a monohydric alcohol, preferably a water-miscible monohydric alcohol, for example methyl alcohol, ethyl alcohol, isopropyl alcohol, butyl alcohol or isobutyl alcohol, and at least one other being a water-immiscible polyalkylene glycol dialkyl or aryl ether, for example a dialkyl ether such as diethylene glycol dibutyl ether (also known as dibutyl digol), triethylene glycol dibutyl ether, or polyethylene glycol dibutyl ether, or a diaryl ether such as polypropylene glycol diphenyl ether, said ether being present in said mixture in a minor proportion by weight. If desired, the monohydric alcohol may be used in combination with another monohydric alcohol and/or with a water-miscible ketone, for example acetone.

Thus in accordance with one aspect of the invention there is provided for use in a liquid flux composition a mixture comprising a major proportion by weight of a monohydric alcohol, preferably a water-miscible monohydric alcohol, and a minor proportion by weight of a water-immiscible polyalkylene glycol dialkyl or aryl ether as an organic solvent for the flux material.

The solvent mixture will generally contain from 5 to 45% by weight of the water-immiscible ether, preferably from 5 to 15%, with the balance being composed of the monohydric alcohol and any other solvents present.

It has been found that advantageous results are obtained when the solvent mixture is used in formulating a liquid flux composition in which the non-corrosive flux material is an aliphatic carboxylic acid, which may be a monocarboxylic acid, for example propionic acid, or preferably a dicarboxylic acid, for example oxalic acid, succinic acid, adipic acid, sebacic acid or malic acid. If desired a mixture of acids may be used.

In a preferred embodiment, the invention provides a liquid flux composition comprising by weight from 0.5 to 5% of an aliphatic dicarboxylic acid as non-corrosive flux material, from 55 to 90% of a water-miscible monohydric alcohol, and from 5 to 45% by weight of a water-immiscible polyalkylene glycol dialkyl or diaryl ether.

The liquid flux composition may advantageously contain other optional ingredients, for example a biocide to provide the soldered PCB with fungus resistance.

It has surprisingly been found that the use of the water-immiscible ether in accordance with the invention makes it possible to achieve improved surface insulation resistance (SIR) test results. SIR refers to the resistance along the surface of a test PCB which has been fluxed and soldered and then subjected to long term, high temperature and humidity testing to see whether areas between conductive tracks become conductive under those conditions. The improved results achieved in accordance with the invention show that the water-immiscible ether is effective in repelling any water or other conductive material absorbed into the PCB during the soldering operation. Likewise the use of the water-immiscible ether improves the corrosion resistance of the soldered joints since there is a lower tendency to absorb moisture.

It has further been found that by using the water-immiscible ether as part of the solvent system in the liquid flux, it is possible to omit any surfactant or wetting agent from the liquid flux even when the latter is to be applied as foam, since the water-immiscible ether itself promotes foaming in the foam fluxing tank. The omission of the surfactant or wetting agent is desirable since if present, it remains on the PCB after soldering and thereby causes a reduction in the SIR test referred to previously.

A further advantage of using a water-immiscible ether in accordance with the invention is that it reduces or eliminates the tendency of the solder to produce solder balling particularly when soldering printed circuit boards bearing certain types of organic resists (insulating materials) which serve to protect those parts of the PCB where soldering is not required. The term "solder balling" refers to the undesirable tendency of solder, when molten, to form small spheres of solder instead of forming a single solder fillet.

It will be appreciated that in accordance with another aspect of the invention, there is provided a method of making solder joints in which a soft solder is used to connect the surfaces to be joined, characterised in that the soft solder is used in conjunction with a liquid flux composition comprising a non-corrosive aliphatic carboxylic acid and an organic solvent mixture therefor comprising a major proportion by weight of a monohydric alcohol and a minor proportion by weight of a water-immiscible polyalkylene glycol dialkyl or diaryl ether.

The liquid flux composition of the invention can be made simply by dissolving the flux material in the organic liquid solvents and incorporating therein any optional further ingredients such as a biocide.

The liquid flux composition can be used in any of the conventional fluxing techniques, advantageously by foam fluxing, or by spray or wave. It may also be used with a wide range of different solder alloys, such as tin/lead solder alloys, for example 60/40 Sn/Pb alloy, tin/lead/antimony solder alloys, for example 60/39.7/0.3 and 63/36.7/0.3 Sn/Pb/Sb alloys, tin/lead/bismuth solder alloys, for example 15/33/52 Sn/Pb/Bi alloy, or tin/lead/silver solder alloys, for example 13/84.5/2.5 Sn/Pb/Ag alloy.

The following Examples illustrate liquid flux compositions in accordance with the invention.

EXAMPLE 1

A liquid flux composition was produced from the following constituents:

|  | % by weight |
| --- | --- |
| Adipic acid | 2.0 |
| Isopropanol | 87.9 |
| Diethylene glycol dibutyl ether | 10.0 |
| o-Phenylphenol (biocide) | 0.1 |

This liquid flux was used to solder electronic components to a printed circuit board using conventional techniques, the liquid flux being applied by foam fluxing and the soft solder, which was a 60/40 Sn/Pb alloy, being subsequently applied by wave soldering.

The resulting soldered PCB exhibited negligible flux residues and without any cleaning operation, passed the MIL-P-28809 cleanliness test. In the SIR test, using the USA Bellcore TA-TSY-000488 test, the soldered PCB gave a pass result after heating at 35° C. and 90% relative humidity for 96 hours, which was some ten times better than results obtained with comparative commercially available low residue liquid fluxes. In addition, the soldered PCB exhibited no solder balling.

EXAMPLE 2

A liquid flux composition was produced from the following constituents:

|  | % by weight |
| --- | --- |
| Adipic acid | 2.5 |
| Isopropanol | 87.4 |
| Diethylene glycol dibutyl ether | 10.0 |
| o-Phenylphenol | 0.1 |

This liquid flux was used in in the manner described in Example 1 and gave similar results.

EXAMPLE 3

A liquid flux composition was produced from the following constituents:

|  | % by weight |
| --- | --- |
| Malic acid | 2.5 |
| Isopropanol | 87.4 |
| Diethylene glycol dibutyl ether | 10.0 |
| o-Phenylphenol | 0.1 |

EXAMPLE 4

A liquid flux composition was produced from the following constituents:

|  | % by weight |
| --- | --- |
| Malic acid | 1.0 |
| Adipic acid | 1.0 |
| Isopropanol | 87.9 |
| Diethylene glycol dibutyl ether | 10.0 |
| o-Phenylphenol | 0.1 |

I claim:

1. In the formation of soldered joints during the production of printed circuit board assemblies by the use in combination of a soft solder and a non-corrosive liquid flux, the improvement which comprises obtaining substantially no or only minimal residues from the soldering operation by utilising as the liquid flux a non-corrosive organic flux material dissolved in an organic solvent mixture comprising a major proportion by weight of a monohydric alcohol and a minor proportion by weight of a water-immiscible ether selected from polyalkylene glycol dialkyl ethers and polyalkylene glycol diaryl ethers, thereby obviating the need for a cleaning step after the soldering operation.

2. The improvement as claimed in claim 1, wherein said organic solvent mixture contains from 5 to 45% by weight of said water-immiscible ether.

3. The improvement as claimed in claim 2 wherein the monohydric alcohol is isopropanol and the water-immiscible ether is diethylene glycol dibutyl ether.

4. A liquid flux composition which when used in soft soldering operations during the production of printed circuit board assemblies leaves substantially no flux residues, said flux composition consisting essentially of a non-corrosive aliphatic carboxylic acid as flux material and an organic solvent mixture therefor comprising a major proportion by weight of a monohydric alcohol and a minor proportion by weight of a water-immiscible polyalkylene glycol dialkyl or diaryl ether.

5. A composition as claimed in claim 4, wherein said organic solvent mixture contains from 5 to 15% by weight of the water-immiscible ether.

6. A composition as claimed in claim 5, wherein the monohydric alcohol is isopropanol and the water-immiscible ether is diethylene glycol dibutyl ether.

7. A composition as claimed in claim 5 or 14, wherein the flux material is an aliphatic dicarboxylic acid and is present in an amount of from 0.5 to 5% by weight of the composition.

8. A method of making solder joints in the production of printed circuit board assemblies in which a soft solder is used in combination with a non-corrosive liquid flux to connect the surfaces to be joined, which comprises applying the soft solder at an elevated temperature subsequent to applying the liquid flux which comprises a non-corrosive aliphatic carboxylic acid as flux material and an organic solvent mixture therefor comprising a major proportion by weight of a monohydric alcohol and a minor proportion by weight of a water-immiscible polyalkylene glycol dialkyl or diaryl ether.

9. A method according to claim 8, wherein the organic solvent mixture contains from 5 to 45% by weight of said water-immiscible ether.

10. A method according to claim 8, wherein the liquid flux comprises from 0.5 to 5% by weight of an aliphatic dicarboxylic acid, from 55 to 90% by weight of the water-immiscible monohydric alcohol and from 5 to 45% by weight of the water-immiscible polyalkylene glycol dialkyl or diaryl ether.

* * * * *